M. POSER.
OPHTHALMIC TEST LENS FRAME.
APPLICATION FILED MAR. 15, 1916.
1,291,127.
Patented Jan. 14, 1919.
2 SHEETS—SHEET 1.
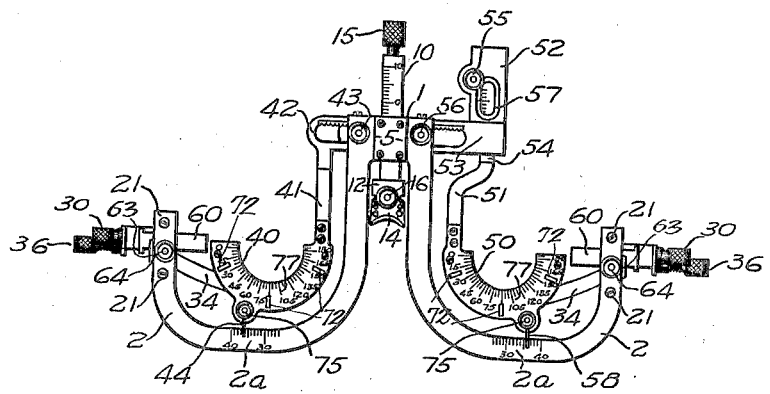
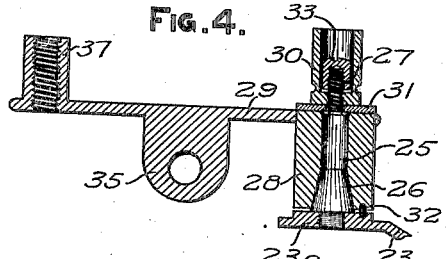
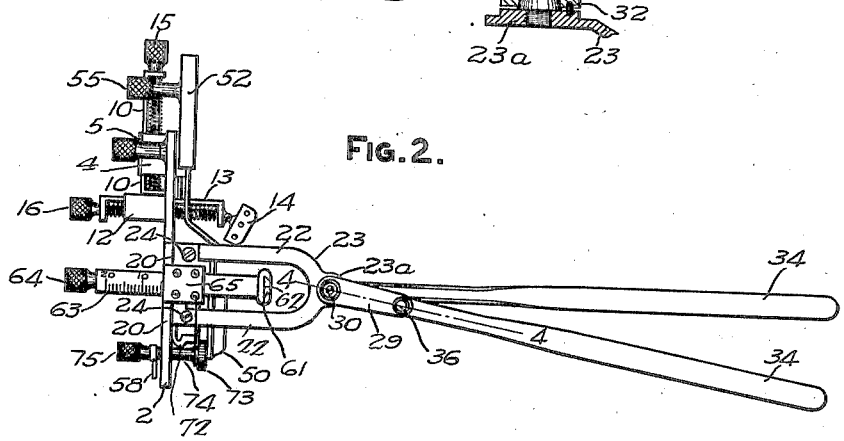

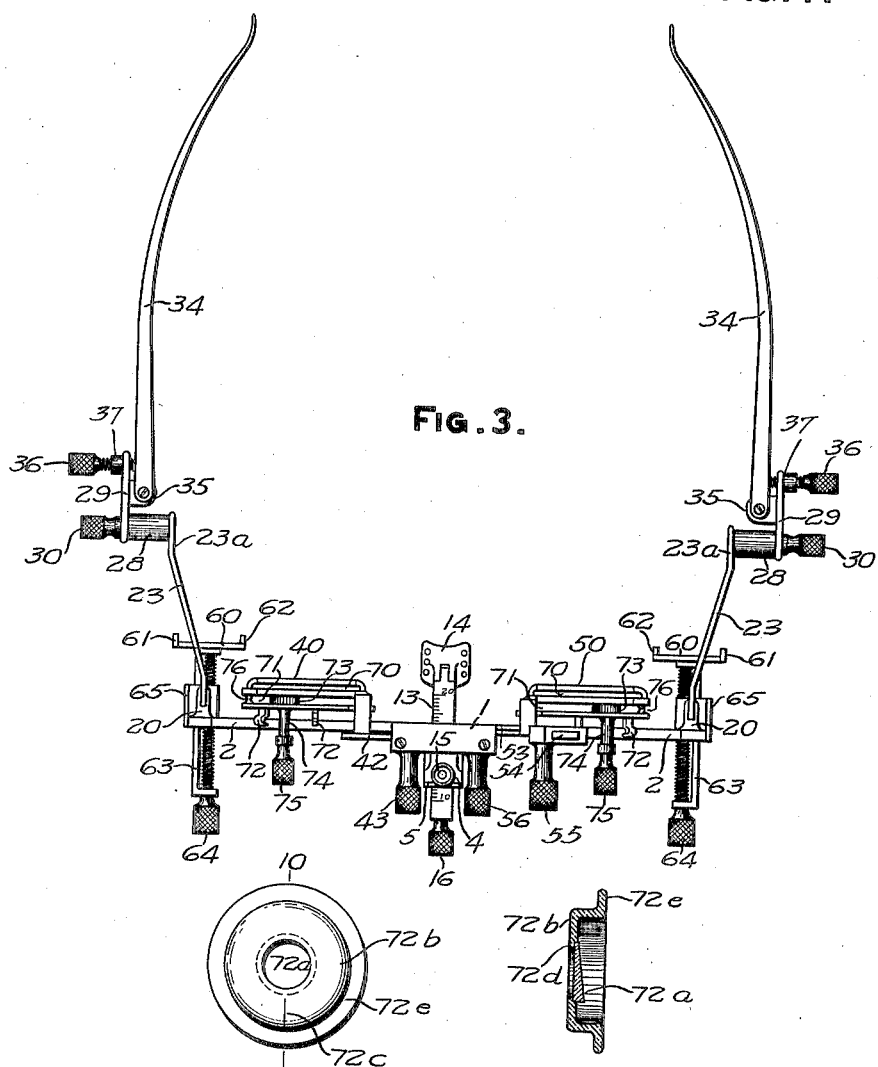

UNITED STATES PATENT OFFICE.

MAX POSER, OF ROCHESTER, NEW YORK, ASSIGNOR TO BAUSCH & LOMB OPTICAL COMPANY, OF ROCHESTER, NEW YORK, A CORPORATION OF NEW YORK.

OPHTHALMIC-TEST-LENS FRAME.

1,291,127.  Specification of Letters Patent.  Patented Jan. 14, 1919.

Application filed March 15, 1916. Serial No. 84,358.

*To all whom it may concern:*

Be it known that I, MAX POSER, a subject of the Grand Duke of Saxe-Weimar, residing at Rochester, in the county of Monroe, State of New York, have invented certain new and useful Improvements in Ophthalmic-Test-Lens Frames; and I do declare the following to be a full, clear, and exact description of the same, reference being had to the accompanying drawings forming a part of this specification and to the characters of reference marked thereon.

My invention relates to apparatus for optical purposes such as is used in testing the refraction of a patient's eyes and obtaining the necessary data for fitting eye-glasses. More particularly my invention relates to a test lens frame that is portable and that is adapted to be supported in position before a patient's eyes by means of a nose piece resting on the patient's nose and a pair of temples by which the device is held in position.

An object of my invention is to provide a light, conveniently manipulated and efficient test lens frame that is adapted to be supported by a patient's nose and held in place by temples, and so organized that the alinement of the members for supporting the lenses will be unaffected by any stress caused by the temples. A test lens frame constructed and organized according to my invention will always hold the trial lenses in axial alinement before a patient's eyes and thus the liability of prismatic effect often inadvertently caused by the trial lenses being held with their axes out of parallelism is eliminated.

In the drawings:

Figure 1 is a front elevation of a test lens frame constructed and organized according to my invention.

Fig. 2 is a side elevation looking from the right of Fig. 1, one of the temples being shown in a horizontal position and the other in an inclined position.

Fig. 3 is a plan view of the apparatus.

Fig. 4 is a sectional view on an enlarged scale taken on the line 4—4 of Fig. 2 and showing the pivotal friction joint between the temple link and the temple spring.

Fig. 5 is a front elevation of a "spherical" trial lens and its mounting and Fig. 6 is a vertical section thereof.

Fig. 7 is a front elevation of a cylinder trial lens and its mounting and Fig. 8 is a side elevation of the same.

Fig. 9 is a front elevation of the "prism" trial lens and its mounting and Fig. 10 is a section on the line 10—10 of Fig. 9.

Like characters of reference throughout the drawings indicate the same parts.

One feature of my invention consists in providing a foundation frame comprising a head by which the trial lens carrier and the nose piece are supported, and a pair of preferably elastic arms extending laterally, one from each side of said head, to which arms are attached the temples. To this end I employ, in the preferred embodiment of my invention as illustrated, a foundation frame embodying the rigid central head 1 and a pair of U shaped arms 2 which extend laterally, one from the right hand side and one from the left hand side of the head 1. In the front face of the boss 4 which projects forwardly from the head 1 and is integral therewith, is formed a channel in which slides the vertical graduated nose piece bar 10 which is held in said channel by a cap plate 5. To the lower end of the bar 10 is secured the block 12 in which is slidably mounted the horizontal graduated nose-piece bar 13 on the rear end of which is hinged, so as to be movable in a vertical plane, the nose piece proper 14. Thus by means of the screw adjustment 15 the nose piece may be raised or lowered and by means of the screw adjustment 16 it may be adjusted inwardly or outwardly to meet the characteristics of the patient's facial features. The graduations of the vertical and horizontal bars 10 and 13 afford a convenient means whereby the position of the nose piece may be accurately read.

A pair of slotted brackets 20 are secured to the rear face of the outer ends of each of the arms 2 by means of screws 21 and a U-shaped temple spring 23 of resilient or flexible material is secured to each pair of brackets 20 by means of its arms 22 which fit in the slotted portions of said brackets and are rigidly held therein by the screws 24. The closed end of each of the springs 23 is provided with an ear or extension 23[a] within which is threaded the stud 25 having a conical shoulder 26 adjacent the ear 23[a] and a threaded portion 27 at its outer end. Upon each of the studs 25 is mounted a hub 28 which is preferably formed rigid with the forward end of the arm 29. A straight circular bore and a conical bore are formed concentrically within the hub 28, the circular bore permitting the body portion of the stud 25 and the threaded portion 27 of the stud to pass freely therethrough, while the conical portion of the said bore coöperates with the conical shoulder 26 of the said stud.

Coöperating with the threaded end of the stud 25 is a nut 30 which presses against the washer 31 interposed between said nut 30 and the outer face of the hub 28 the nut acting when tightened to force the internal conical portion of the hub 28 and the conical shoulder 26 of the stud into such intimate contact that the hub 28 and the stud 25 are frictionally bound together against relative angular movement the two elements obviously being always constrained against either lateral or longitudinal movement. For limiting the extent of movement of the hub 28 and arm 29 about the stud 25, a stop pin 32 is provided which coöperates with a slot in the inner face of the hub 28, 30° of angular movement ordinarily being sufficient. Thus by loosening the nut 30 the arm 29 may be adjusted in an angular position with relation to the spring 23 within the limits allowed by the stop pin 32 and the desired position of adjustment maintained by tightening the nut 30.

In order to guard against the nut 30 being lost a check nut 33 is threaded onto the end of the threaded portion 27 of stud 25.

A pair of temples 34 coöperate with the nose piece 14 in holding the apparatus before the patient's eyes. The nose-piece acts to locate and support the foundation frame bodily, while the temples, which are hinged to the lugs 35, formed on the arms 29, are clamped to the patient's head by means of set screws 36 which are threaded in the bosses 37 on the rear end of arms 29, thus the temples position the foundation frame and hold it to the patient's head.

The portion of the apparatus thus far described relates to the foundation frame and the means for securing said frame before the eyes of the patient. For carrying the trial lenses, a pair of lens carrying members 40 and 50 are mounted so as to be laterally adjustable within the rigid upper portion of the head 1 of the foundation frame. This lateral adjustment is for the purpose of accommodating the trial lens holders independently to various lateral distances between a patient's nose and each of his pupils. The vertical adjustment of the trial lens carrying members is effected first by means of the screw 15 which raises or lowers the frame bodily with relation to both of the patient's eyes, this adjustment being for the purpose of bringing the trial lens holder 40 in alinement with the patient's right eye.

An additional independent vertical adjustment is provided for adjusting the trial lens holder 50 with relation to the patient's left eye and thus the instrument is readily accommodated to those patients whose eyes do not lie normally in the same horizontal plane.

In carrying out these features of my invention, I preferably hang the trial lens member 40 on a bar 41 depending from a laterally movable slide 42, which is mounted in the head 1. A rack and pinion adjustment, operated by pinion head 43 is provided as a convenient means for effecting the lateral adjustment of the member 40. The left eye trial lens carrying member 50 is hung on an offset bar 51 which terminates at its upper end in a graduated slide 54, mounted in a vertical slide-way member 52 the latter being formed integral with the horizontal slide 53 which in turn is mounted in a horizontal slide-way in the head 1. The vertical slide 54 and the horizontal slide 53 are provided with a rack and pinion adjustment, the pinion head 55 providing a convenient means for independently adjusting the holder 50 vertically while the head 56 provides a convenient means for independently adjusting the said holder 50 laterally.

In the forward face of the member 52 is formed a bevel sided aperture 57 which reveals the graduations formed on the forward face of the vertical slide 54. The horizontal mark on the left vertical side of the beveled aperture see Fig. 1, provides an index with which the scale on the slide 54 coöperates, whereby the extent of elevation or depression of the trial lens holder 50 relatively to a normal position, is indicated. For indicating the lateral location of each of the patient's pupils with relation to the bridge of the nose and with relation to each other, a pair of depending pointers namely 44 and 58 are provided, one on the forward face of each of the trial lens holders, as best shown in Fig. 1.

The pointers coöperate with a pair of scales 2ª formed on the forward faces of the arms 2—2 best shown in Fig. 1. By means of pointers 44 and 58 and their coöperating scales 2ª, the lateral location of the patient's pupils from the center of the bridge of the nose may be read directly.

For measuring the distance between the cornea of either of the patient's eyes and the vertex of the adjacent surface of a trial lens placed immediately before either eye, a sighting device mounted on a graduated slide bar, is provided for each eye. By this means, if the apex of the cornea of either eye is properly sighted, the distance from said cornea to the respective lens vertex will be measured by the scale on the slide bar. To this end I provide the sight bars 60 each of which carries a pair of coöperating sights namely; a rear sight 61 at its outer end and a rear sight 62 at its inner end. In the present embodiment the sight 61 is a dove-tail slot and the sight 62 is a corresponding dove-tail projection. Each sight bar 60 is carried on the rear end of a graduated slide bar 63 as best shown in Figs. 2 and 3 and is adjustable forwardly and backwardly by means of the screw adjustment 64. The slides 63 are each mounted in a recess formed in the bosses extending rearwardly from the outer ends of each of the arms 2 and held therein by means of the plates 65, one edge of each plate indexing with the graduations on the adjacent slide 63. The position of the sight bars 60 is such as to lie in the same horizontal plane as the eyes of the patient and the arrangement of the temple springs 23, relative to the sight bar 60 and its slide 63, is such that the sighting bar is readily accommodated between the arms 22 of the temple springs 23 as best shown in Figs. 2 and 3. In using the sighting device for measuring the distance between respective corneas and trial lenses, it is merely necessary to bring into alinement the apex of the respective cornea and the adjacent pair of sights 61, 62, which is easily effected by means of the screw adjustment 64, when the distance from the apex of either cornea to the vertex of its respective trial lens may be read directly from the scale on the slide bar 63.

Each of the trial lens carrying members comprises a rear pocket 70 for carrying the spherical trial lens in its mounting, and an intermediate pocket 71 for carrying a cylindrical lens in its mounting and a pocket comprising three hooks 72 for carrying a mounted prism lens.

The spherical trial lens and its mounting is well shown in Figs. 5 and 6 and consists of a disk shaped mounting 70$^a$ having a convenient handle 70$^b$ thereon. In this mounting is fitted, preferably, a plano concave or plano convex lens as the case may be, in such a manner that the curved surface faces the cornea and thus permits of direct measurements being made from the principal point on the curved trial lens surface 70$^c$ to the apex of the cornea. The graduations on the slide 63 are so arranged that, when the graduations register zero, the line of sight will be coincident with that vertex of the lens 70$^c$ which faces the patient's eye which in this case is the vertex of the concave side.

The cylindrical trial lens mounting comprises a circular disk 71$^a$ in which a cylindrical lens element 71$^b$ is mounted with its longitudinal axis indicated by the index line 71$^c$. To prevent back-lash or dead action, the periphery of the disk 71$^a$ is provided with a series of transverse knurled corrugations 71$^d$ (see Fig. 7) of a pitch designed to coöperatively mesh with a small knurled pinion 73 which pinion functions to rotate the disk 71$^a$ as hereinafter further explained.

The prism trial lens 72$^a$ shown in Figs. 7, 9 and 10 is mounted by cementing the lens within a circular recess 72$^d$ formed in the transparent flanged cup shaped mounting 72$^b$ which mounting may be made of celluloid. The position of the base of said prism trial lens is indicated by an index line 72$^c$ formed on said mounting on the same side as and perpendicular to the base of the prism lens.

In applying my improved test lens frame to a patient's head and in manipulating the instrument, the procedure is as follows:

The apparatus is placed with the temples 34 passing at opposite sides of the patient's head and the nose piece 14 resting on the patient's nose. The adjusting screws 15 and 16 are then operated until the foundation frame is suitably positioned before the eyes of the patient, after which the temple tension screws 36 are tightened until the apparatus is firmly held before the patient's eyes. After inserting suitable centering glasses into the pockets of the lens holders 40 and 50 respectively, the trial lens holder 40 is adjusted laterally by turning the pinion head 43 until it is in line laterally with the patient's right eye after which the apparatus is raised or lowered bodily by means of the adjusting screw 15 until said holder 40 is brought into line with the pupil of the patient's right eye. The trial lens holder 50 is next brought into lateral alinement with the patient's left eye by means of the adjustment 56 after which said holder is brought into vertical alinement by means of the independent vertical adjustment 55. The trial lens holders 40 and 50 should now both be concentric with the pupils of the patient's eyes.

The eyes of the patient may now be refracted in the usual manner, using if required, a set of spherical trial lenses set in mounts 70$^a$ (shown in Figs. 5 and 6) which are adapted to be interchangeably substituted in the pockets 70. For refracting astigmatic eyes, the cylindrical trial lenses set in mounts 71$^a$, having the knurled peripheries 71$^d$ as shown in Figs. 7 and 8 are inserted in the pockets 71. When in either of the pockets 71, the knurled periphery 71$^d$ of the mount 71$^a$ rests upon a knurled pinion wheel 73 which is journaled in the boss 74, formed integral with the front portion of the trial lens holders 40 and 50. A knob 75 is provided as a means for rotating the pinion wheel 73. The knurling of the pinion wheel 73 and the knurling on the periphery of the cylindrical trial lens mounting 71$^a$ are made to correspond so that the transversely corrugated periphery of the knurled wheel 73 meshes with the knurled corrugations 71ᵈ of the mounting 71ᵃ, the wheel 73 and the disk 71ᵃ coöperating in the manner of a pinion and gear. However while possessing the advantages of a spur gear the coöperating knurled corrugations possess the further advantage of low cost and smooth motion without any fitting. The cylindrical trial lens mountings 71ᵃ are loosely constrained laterally by studs 76 which act as ends of the trial lens pocket 71. A scale 77 (see Fig. 1) is provided on the front wall of the pocket 71 and with this scale coöperates the index marker 71ᶜ on the mounting of the cylindrical trial lens, whereby the position of the axis of the patient's astigmatism may be readily ascertained.

When prismatic refraction is required, a set of prism lenses, mounted as described in a transparent mounting 72ᵇ, are adapted to be placed before the patient's eyes with that wall to which the prism is secured protruding toward the patient's eye. The flange portion 72ᵉ in this case rests in the throats of the hooks 72 and after the proper position of the prism base has been found, which is readily done by rotating the flange portion of the mounting with the finger, the position of said base may be conveniently read through the transparent mounting 72ᵇ since the index mark 72ᶜ on the outer surface of its wall is adjacent one of the scales 77 on the trial lens holders 40 and 50 when the prism mounting 72ᵇ is in position.

After the patient has been refracted, the distance between the apex of the cornea of each of the patient's eyes and the vertex of its respective trial lens may next be measured in the manner and by the means hereinbefore set forth.

A feature of the transparent mounting 72ᵇ is that the patient may be refracted and, after spherical or cylindrical lenses, or both have been applied, and a prism should be required, said prism may be used and rotated independently of the cylinder lens and without removing the latter. Further, the position of the axis of the cylinder may be read through the transparent prism mounting simultaneously with the position of the base of the prism lens.

Another advantage is that since the index mark 71ᶜ of the cylinders and the index mark 72ᶜ of the prisms both register with the same scale viz., 77, but one scale is needed.

It will be noted that the trial lens carrying members 40 and 50 are carried on slides mounted in the rigid head 1 of the foundation frame and also that the springs 23 are interposed between the temples and the foundation frame, and thus even though the temples may be clamped hard and thus caused to exert both a lateral stress and tension tending to pull the free ends of the arms 2 backward, the optical elements will remain in their normal positions, the stresses referred to having no effect whatever on the alinement of the members carrying the trial lenses. Thus an operator may always depend on the trial lenses being properly centered and alined before a patient's eyes providing he has properly adjusted the instrument.

Having thus described my invention, what I claim and desire to secure by Letters Patent of the United States is:

1. In an optical apparatus for testing eyes, the combination with a rigid central frame head having a support adapted to rest on a portion of the patient's head, of a pair of test lens carriers supported by the frame head and each adapted to be arranged in alinement with one of the patient's eyes, a pair of temples arranged one on either side of the frame head for holding the frame in position on the patient's head, and a pair of oppositely disposed elastic arms one directly interposed between each of the temples and the frame head for absorbing the tendency of the temples to flex the frame and affect the alinement of the lens carriers.

2. An optical apparatus for testing eyes embodying a foundation frame comprising a rigid head and a pair of relatively flexible arms extending laterally one from each side of said head, an adjustable nose piece carried by said head, a pair of temples attached one to the outer extremity of each arm, a pair of independent laterally adjustable slides mounted in said head and a trial lens carrier attached to each of said slides.

3. An optical apparatus for testing eyes embodying a foundation frame comprising a rigid head and a pair of relatively flexible laterally extending arms, means for holding said frame to a patient's head, a pair of laterally movable slides mounted in said head, a trial lens carrier rigidly connected to one of said slides, a vertical slide and slideway associated with the other of said slides, a trial lens carrier attached to said vertical slide and means for raising and lowering the foundation frame bodily.

4. An optical apparatus for testing eyes embodying a foundation frame comprising a head and a pair of arms extending laterally one from each side of said head, a nose piece carried by said head, a pair of temple springs secured one to the outer extremity of each arm, a pair of temples secured one to the free end of each of said temple springs and a pair of laterally movable trial lens carriers carried by said head and arranged one on either side thereof.

5. In an optical apparatus for testing eyes, the combination with a pair of trial lenses, a nose piece and supporting means common to both, of a pair of inwardly curving laterally movable temples adapted to embrace a patient's head, a connection, including a laterally yielding spring and a hinge, interposed between each of said temples and the supporting means, and means adapted to effect a closing together and adapted to permit a spreading apart of said temples.

6. An optical apparatus for testing eyes embodying a foundation frame comprising a rigid head and a pair of relatively flexible curved arms extending laterally one from each side of said head, a pair of trial lens carriers arranged one within the embrace of each of said arms, a pair of slides mounted to be laterally movable in the upper portion of said head, a rigid connection between one of said lens carriers and one of the slides, an adjustable connection between the second lens carrier and the remaining slide, said adjustable connection permitting vertical movement of said second lens carrier with relation to the first named lens carrier, a scale arranged on the front face of the laterally extending portion of each of said arms, a pointer projecting from each of the trial lens carriers across the corresponding scale and adapted to index therewith, a nose piece carried by said head and a pair of temples connected to the outer ends of said arms whereby said apparatus may be held in position on a patient's head.

7. In an optical apparatus for testing eyes, the combination with a rigid central frame head having a support adapted to rest on a portion of the patient's head, of a pair of test lens carriers sustained by the frame head, means on the frame adapted to laterally adjust one lens carrier and to laterally and vertically adjust the other lens carrier to aline the carriers with the patient's eyes, a pair of temples arranged one on either side of the frame head for holding the frame in position on the patient's head, a pair of oppositely disposed curved arms extending laterally one from each side of said frame head and embracing the adjacent lens carriers, and flexible connections between the temples and the curved arms.

MAX POSER.

Witnesses:
WILLIAM G. WOODWORTH,
GEORGE A. PAGE.